Aug. 23, 1949.  H. W. LASSILA  2,479,748
POST PULLER
Filed Feb. 19, 1948
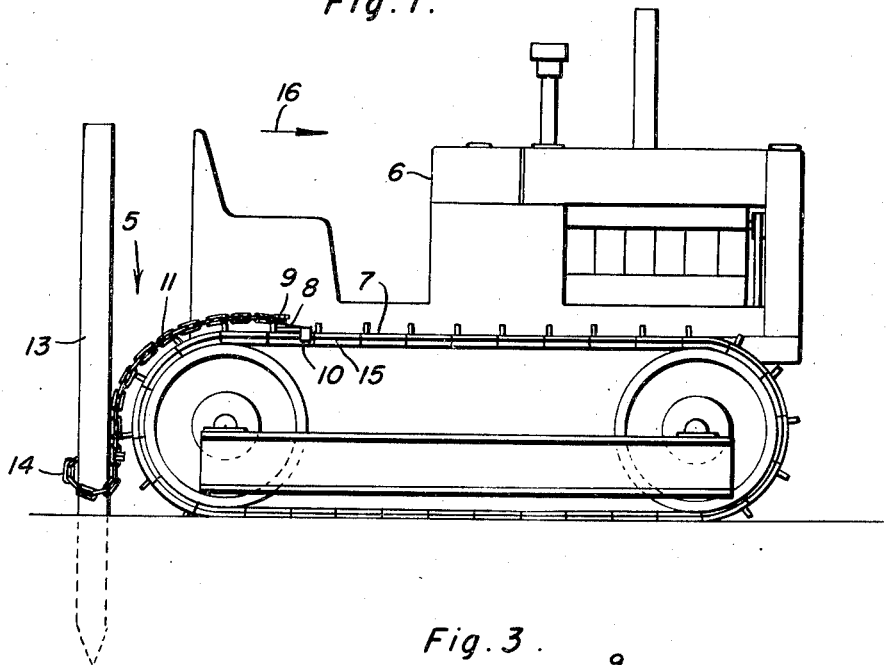
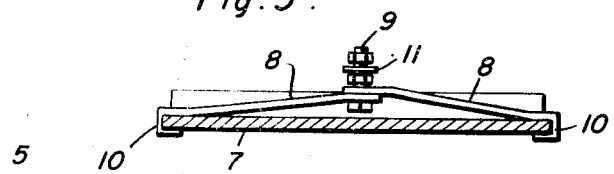
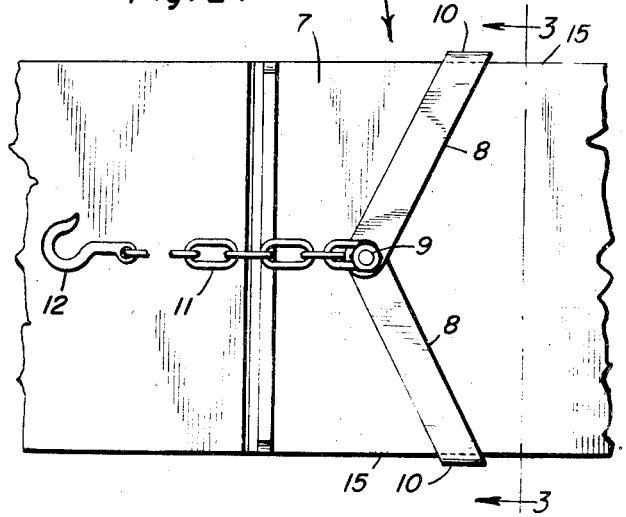
Henry W. Lassila
INVENTOR.

Patented Aug. 23, 1949

2,479,748

UNITED STATES PATENT OFFICE 2,479,748

POST PULLER

Henry W. Lassila, Great Falls, Mont.

Application February 19, 1948, Serial No. 9,570

2 Claims. (Cl. 254—132)

This invention relates to new and useful improvements and structural refinements in pullers for posts and other similar objects, and the principal object of the invention is to provide a device of the character herein described, which is particularly adapted for use in association with a tractor equipped with an endless track.

A further object of the invention is to provide a post puller which is simple in construction and which may be quickly and easily applied to and removed from the post, as well as the tractor track with which it is used.

Another object of the invention is to provide a post puller which will not easily become damaged, which will readily lend itself to economical manufacture, and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a side elevational view of the invention in use;

Figure 2 is a fragmentary top plan view, emphasizing the attachment of the invention to a tractor track, and Figure 3 is a cross-sectional view, taken substantially in the plane of the line 3—3 in Figure 2.

Like characters of reference are employed to designate like parts in the specification and throughout the several views.

Referring now to the accompanying drawings in detail, the invention consists of a post puller designated generally by the reference character 5, the puller being adapted for use in association with a tractor 6 equipped with a pair of endless tracks 7.

The puller includes in its construction a pair of divergent arms 8 which are pivotally connected together at the convergent ends thereof by means of a bolt or pin 9, while the outer divergent end portions of the arms 8 are doubled under themselves, so to speak, to provide U-shaped hooks 10.

One end of a flexible element, such as for example, a length of chain 11 is attached to the pivot 9, while the remaining end of the chain is equipped with a hook 12, so that the free end portion of the chain may be securely looped around a post 13 which is to be pulled, as indicated at 14.

When the invention is placed in use, the tractor 6 is maneuvered so that one of its endless tracks 7 is disposed immediately adjacent the post 13, whereupon the arms 8, more particularly, the hooks 10 of the arms, are spread apart and applied to or engaged with the side edge portions 15 of the endless track, substantially as shown. It will be apreciated that spreading of the arms is facilitated by the pivotal connection 9.

In any event, the free end portion of the chain 11 is then secured around the post 13, whereupon by driving the tractor in the direction of the arrow 16 the post will be quickly and easily pulled from the ground.

It is to be noted that inasmuch as the chain 11 passes up and over the tractor track, the post 13 will be pulled or lifted in a substantially upward direction. Morever, the pivotal connection 9 of the arms 8 will assure that the hooks 10 are urged in secure engagement with the edges of the track 7 while the post is being pulled.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In association with a tractor having an endless track, a post puller comprising a flexible element attachable at one end thereof to the work, a pair of divergent arms pivoted at their convergent ends to the remaining end of said element, and hooks provided at the divergent ends of said arms, said hooks being engageable with the side edge portions of said track.

2. In association with a tractor having an endless track, a post puller comprising a flexible element attachable at one end thereof to the work, and a clamp at the remaining end of said element, said clamp including a pair of pivoted arms provided at the ends thereof with hooks engageable with the track of said tractor.

HENRY W. LASSILA.

REFERENCES CITED

The following references are of record in the file of this patent:

UNITED STATES PATENTS

| Number | Name | Date |
|---|---|---|
| 1,075,008 | Boden | Oct. 7, 1913 |
| 1,547,496 | Holt | July 28, 1925 |